US 12,451,186 B2

(12) United States Patent
Lei

(10) Patent No.: US 12,451,186 B2
(45) Date of Patent: Oct. 21, 2025

(54) MULTI-STEP PROGRAMMING SCHEMES FOR PROGRAMMING CROSSBAR CIRCUITS

(71) Applicant: TetraMem Inc., Fremont, CA (US)

(72) Inventor: Gong Lei, Sunnyvale, CA (US)

(73) Assignee: TetraMem Inc., San Jose, CA (US)

( * ) Notice: Subject to any disclaimer, the term of this patent is extended or adjusted under 35 U.S.C. 154(b) by 105 days.

(21) Appl. No.: 18/479,953

(22) Filed: Oct. 3, 2023

(65) Prior Publication Data

US 2025/0111877 A1 Apr. 3, 2025

(51) Int. Cl.
*G11C 13/00* (2006.01)

(52) U.S. Cl.
CPC ...... *G11C 13/0069* (2013.01); *G11C 13/0026* (2013.01); *G11C 13/0028* (2013.01); *G11C 13/003* (2013.01); *G11C 2213/79* (2013.01)

(58) Field of Classification Search
CPC ............ G11C 13/0069; G11C 13/0026; G11C 13/0028; G11C 13/003; G11C 2213/79
USPC ........................................................ 365/148
See application file for complete search history.

(56) References Cited

U.S. PATENT DOCUMENTS

| 6,442,070 | B1 | 8/2002 | Tanaka et al. |
| 2006/0198195 | A1 | 9/2006 | Hemink et al. |
| 2011/0170359 | A1 | 7/2011 | Moschiano et al. |
| 2012/0014163 | A1* | 1/2012 | Yamazaki .......... G11C 13/0069 365/148 |
| 2015/0262675 | A1 | 9/2015 | Lin et al. |
| 2016/0314843 | A1 | 10/2016 | Tseng et al. |
| 2022/0157376 | A1* | 5/2022 | Franklin .................. H01L 25/18 |
| 2023/0395136 | A1* | 12/2023 | Martinelli ........... G11C 11/4078 |

* cited by examiner

*Primary Examiner* — Ly D Pham
(74) *Attorney, Agent, or Firm* — Jaffery Watson Hamilton & DeSanctis LLP

(57) ABSTRACT

Methods for programming crossbar circuits are provided. The methods include initializing a word line voltage, a bit line voltage, and a select voltage applied to a cross-point device of the crossbar circuit. The methods further include raising the word line voltage without changing the bit line voltage. The bit line voltage may be raised without changing the word line voltage applied to the cross-point device. The word line voltage and the bit line voltage may be alternatively changed until they reach their respective desired values. In some embodiments, the methods further include setting the bit line voltage to a predetermined value and raising the word line voltage without changing the select voltage. The select voltage may then be raised without changing the word line voltage applied to the cross-point device. The word line voltage and the select voltage may be alternatively changed until they reach their respective desired values.

20 Claims, 6 Drawing Sheets

MULTI-STEP PROGRAMMING SCHEMES FOR PROGRAMMING CROSSBAR CIRCUITS

TECHNICAL FIELD

The implementations of the disclosure relate generally to crossbar circuits including resistive random-access memory (RRAM) devices and, more specifically, to multi-step programming schemes for programming crossbar circuits.

BACKGROUND

A crossbar circuit may refer to a circuit structure with interconnecting electrically conductive lines sandwiching a memory element, such as a resistive switching material, at their intersections. The resistive switching material may include, for example, a memristor (also referred to as resistive random-access memory (RRAM or ReRAM)). Crossbar circuits may be used to implement in-memory computing applications, non-volatile solid-state memory, image processing applications, neural networks, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, a method for programming (e.g., forming or setting) a crossbar circuit is provided. The method includes: initializing a word line voltage applied to a word line and a bit line voltage applied to a bit line; applying a first voltage to the word line without changing the bit line voltage applied to the bit line; applying a second voltage to the bit line without changing the word line voltage applied to the word line; and in view of a determination that a target word line voltage is not applied to the cross-point device, applying a first incremental voltage to the word line. A cross-point device of the crossbar circuit is connected to the word line and the bit line. The cross-point device includes a resistive random-access memory (RRAM) device In some embodiments, each of the first voltage, the second voltage, and the first incremental voltage is not greater than a maximum allowed voltage of a transistor that provides access control for the RRAM device.

In some embodiments, the target word line voltage is greater than the maximum allowed voltage of the transistor that provides access control for the RRAM device.

In some embodiments, the method further includes in view of a determination that a target bit line voltage is not applied to the bit line, applying a second incremental voltage to the bit line without changing the word line voltage applied to the word line.

In some embodiments, the second incremental voltage is not greater than a difference between the word line voltage being applied to the cross-point device and a threshold voltage of the transistor.

In some embodiments, the second incremental voltage is not greater than a sum of the word line voltage being applied to the cross-point device and the maximum allowed voltage of the transistor.

In some embodiments, the target bit line voltage is greater than the maximum allowed voltage of a transistor that provides access control for the RRAM device.

In some embodiments, initializing the word line voltage applied to the word line includes setting the word line voltage applied to the word line to zero.

In some embodiments, initializing the bit line voltage applied to the first bit line includes setting the bit line voltage applied to the first bit line to zero.

In some embodiments, the method further includes applying a predetermined select voltage to a select line connected to the cross-point device.

In some embodiments, the crossbar circuit includes a plurality of word lines intersecting with a plurality of bit lines and a plurality of cross-point devices, wherein each of the cross-point devices is connected to one of the word lines and one of the bit lines.

According to one or more aspects of the present disclosure, a method for programming (e.g., deforming or resetting) a crossbar circuit, the method including: initializing a word line voltage applied to a word line and a select voltage applied to a select line, wherein a cross-point device of the crossbar circuit is connected to the word line and the select line, and wherein the cross-point device includes a resistive random-access memory (RRAM) device; applying a first voltage to the word line without changing the select voltage applied to the select line; applying a second voltage to the select line without changing the word line voltage applied to the word line; and in view of a determination that a target word line voltage is not applied to the cross-point device, applying a first incremental voltage to the word line.

In some embodiments, the method further includes: connecting a bit line voltage applied to a bit line connected to the cross-point device to a predetermined voltage source.

In some embodiments, each of the first voltage, the second voltage, and the first incremental voltage is not greater than a maximum allowed voltage of a transistor that provides access control for the RRAM device.

In some embodiments, the target word line voltage is greater than the maximum allowed voltage of the transistor that provides access control for the RRAM device.

In some embodiments, the method further includes in view of a determination that a target select voltage is not applied to the select line, applying a second incremental voltage to the select line without changing the word line voltage being applied to the first word line, wherein the second incremental voltage is not greater than a difference between the word line voltage being applied to the cross-point device and a threshold voltage of the transistor.

In some embodiments, the target bit line voltage is greater than the maximum allowed voltage of a transistor that provides access control for the RRAM device.

In some embodiments, initializing the word line voltage applied to the first word line includes setting the word line voltage applied to the first word line to zero.

In some embodiments, initializing the select voltage applied to the first select line includes setting the select voltage applied to the first select line to zero.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Figure 1:
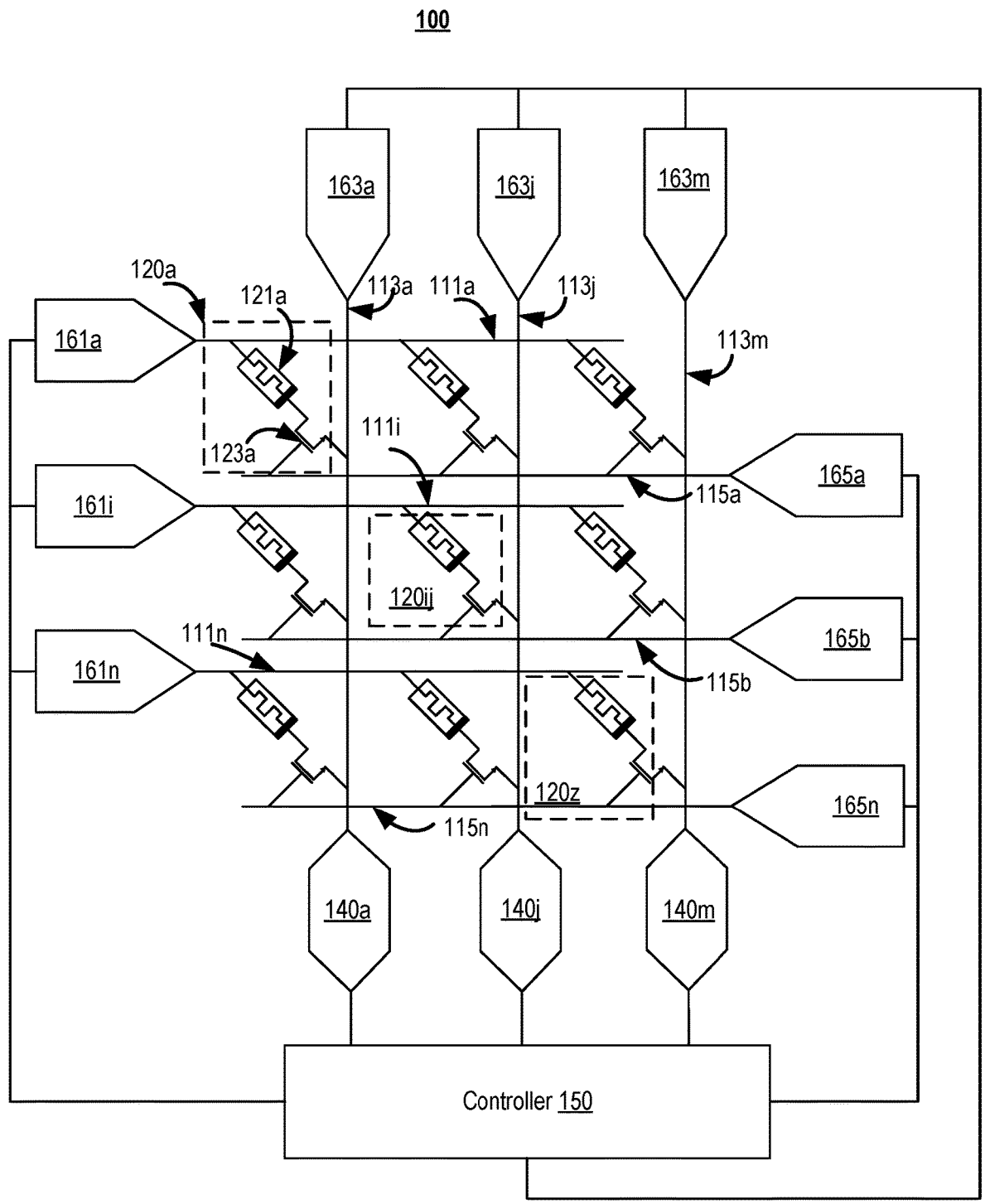
FIG. 1 is a diagram illustrating an example crossbar circuit in accordance with some embodiments of the present disclosure.

The present disclosure provides mechanisms for programming crossbar circuits utilizing resistive random-access memory (RRAM) devices. An RRAM device is a two-terminal passive device with programmable resistance. An RRAM device may be electrically switched between a high-resistance state and a low-resistance state in response to the application of suitable programming signals. A forming process may refer to programming an RRAM device starting from the virgin state. The RRAM device may be programmed from the high resistance state to a lower resistance state in a setting process (also referred to as a "SET" operation). The RRAM device may be programmed from the low resistance state in a resetting process (also referred to as a "RESET" operation).

Crossbar circuits typically utilize transistors to provide access control and/or current compliance for RRAM devices. As the crossbar circuits scale down, the transistors in the crossbar circuits must be scaled down accordingly. However, smaller transistors usually have a reduced maximum allowed voltage. This may constrain the voltage supplied to an RRAM device through the transistors. For example, a programming voltage that is greater than the maximum allowed voltage of a transistor cannot be provided to an RRAM device via the transistor. To address this, the present disclosure provides mechanisms for programming crossbar circuits utilizing low-voltage transistors with smaller sizes. This approach can facilitate crossbar designs with compact transistors with a low maximum allowed voltage, thereby minimizing the bit cell area.

In some embodiments, a forming operation or a set operation on an RRAM device may require the application of a target word line voltage and a target bit line voltage to a word line and a bit line connected to the RRAM device, respectively. A transistor with a maximum allowed voltage (Vmax) may provide access control for the RRAM device. The values of the target word line voltage and the target bit line voltage may surpass Vmax. To perform the forming or set operation, the bit line voltage and the word line voltage applied to the RRAM device may be reset to zero. The word line voltage V_wl may be raised up to Vmax without altering the bit line voltage. In one implementation, a current-mode digital-to-analog converter (IDAC) may provide programming signals to the RRAM device. In such an implementation, the bit line voltage may be raised up to V_wl–Vth without altering the word line voltage V_wl, where Vth is the threshold voltage of the transistor. In another implementation, the bit line may be raised up to V_wl+Vmax without altering the word line voltage V_wl being applied to the cross-point device. This sequence of incrementally raising the word line voltage and the bit line voltage may be cyclically repeated until both the word line voltage and the bit line voltage have reached their respective desired levels. As such, the forming or set operation may be performed by incrementally raising the word line voltage and the bit line voltage applied to the RRAM device to their respective desired levels.

In some embodiments, a deforming operation or a reset operation on the RRAM device may require the application of a target word line voltage and a target select voltage to the word line and the select line connected to the RRAM device, respectively. The values of the target word line voltage and the target select voltage may surpass Vmax. To perform the deforming or reset operation, the word line voltage and the select voltage applied to the RRAM device may be reset to zero. The bit line may be connected to a predetermined voltage source (e.g., VSS or voltage source supply). The word line voltage V_wl may be raised up to Vmax without altering the select voltage. The select voltage may then be raised up to V_wl–Vth without altering the word line voltage. This sequence of incrementally raising the word line voltage and the select voltage may be cyclically repeated until both the word line voltage and the select voltage have reached their respective desired levels. As such, the deforming or reset operation may be performed by incrementally raising the word line voltage and the select voltage applied to the RRAM device to their respective desired levels.

FIG. 1 is a diagram illustrating an example crossbar circuit 100 in accordance with some embodiments of the present disclosure. As shown, crossbar circuit 100 may include a plurality of intersecting electrically conductive wires, such as one or more row wires 111a, . . . , 111i, . . . , 111n, and column wires 113a, . . . , 113j, . . . , 113m for an n-row by m-column crossbar array. The crossbar circuit 100 may further include cross-point devices 120a, . . . , 120ij, . . . , 120z, etc. The number of the column wires 113a-m and the number of the row wires 111a-n may or may not be the same. Crossbar circuit 100 may further include select lines 115a, 115b, . . . , 115n. Each of the cross-point devices may connect a row wire, a column wire, and a select line. For example, the cross-point device 120ij may connect the row wire 111i and the column wire 113j. Each of the row wires 111a-n, column wires 113a-m, and select lines 115a-n may be a metal wire. In some embodiments, each row wire 111a-n may be a word line, and each column wire 113a-m may be a bit line. In some embodiments, each row wire 111a-n may be a bit line, and each column wire 113a-m may be a word line.

Crossbar circuit 100 may further include one or more row wire drivers 161a, 161i, . . . , 161n connected to the row wires 111a-n, column wire drivers 163a, 163j, . . . , 163m connected to the column wires 113a-m, select line drivers 165a, 165b, . . . , 165n connected to the select lines 115a-n. Each of row wire drivers 161a-n, column wire drivers 163a-m, and select line drivers 165a-n may include any suitable component (e.g., current-mode digital-to-analog converters (IDACs), voltage-mode DACs, etc.) for generating and providing programming signals (e.g., voltage signals, current signals). A row wire driver 161a, 161i, . . . , 161n may apply programming signals to one or more cross-point devices 120a-z via a respective row wire 111a-n. A column wire driver 163a, 163j, . . . , 163m may apply programming signals to one or more cross-point devices 120a-z via a respective column wire 113a-m. A select line driver 165a, 165b, . . . , 165n may apply programming signals to one or more cross-point devices 120a-z via a respective select line 115a-n.

Each cross-point device 120*a-z* may be and/or include any suitable device with programmable resistance, such as phase-change memory (PCM) devices, floating gates, spintronic devices, ferroelectric devices, RRAM devices, etc. Each cross-point device 120*a-z* may be programmed to a suitable conductance value by applying suitable programming signals (e.g., suitable voltage signals or current signals) across the cross-point device. The resistance of each cross-point device may be electrically switched between a high-resistance state and a low-resistance state. Setting a cross-point device may involve switching the resistance of the cross-point device from the high-resistance state to the low-resistance state. Resetting the cross-point device may involve switching the resistance of the cross-point device from the low-resistance state to the high-resistance state.

Each cross-point device 120*a-z* may include one or more transistors and may include an n-transistor-m-resistor (nTmR) configuration, where n and m denote the number of transistors and the number of programmable devices (e.g., RRAM devices) in the cross-point device, respectively. The transistor(s) may provide access control for the RRAM device in the cross-point device.

In some embodiments, one or more cross-point devices 120*a-z* may include a one-transistor-one-resistor (1T1R). For example, as shown in FIG. 1, a cross-point device 120*a* may include an RRAM device 121*a* and a transistor 123*a* that are connected in series. Transistor 123*a* may provide access control for RRAM device 121*a*. The transistor may include a gate terminal, a source terminal, and a drain terminal. In some embodiments, a first terminal of RRAM device 121*a* may be connected to the drain of transistor 123*a*. A second terminal of RRAM device 121*a* may be connected to row wire 111*a*. The source terminal of transistor 123*a* may be connected to column wire 113*a*. The gate terminal of transistor 123*a* may be connected to select line 115*a*. In one implementation, row wire 111*a* and column wire 113*a* may be a word line and a bit line, respectively. In another implementation, row wire 111*a* and column wire 113*a* may be a bit line and a word line, respectively.

Transistor 123*a* may function as a selector during the programming of RRAM device 121*a*. In one implementation, transistor 123*a* may further function as a current controller and may set the current compliance to RRAM device 121*a*. For example, the gate voltage on transistor 123*a* may set current compliances for RRAM device 121*a* during programming and can thus control the conductance and analog behavior of cross-point device 120*a*. When cross-point device 120*a* and/or RRAM device 121*a* is set from a high-resistance state to a low-resistance state, a set signal (e.g., a voltage signal, a current signal) may be provided via row wire 111*a* (or column wire 113*a*). Another voltage, also referred to as a select voltage or gate voltage, may be applied via select line 115*a* to the transistor gate of transistor 123*a* to open the gate and set the current compliance, while column wire 113*a* (or row wire 111*a*) may be grounded. When cross-point device 120*a* and/or RRAM device 121*a* is reset from the low-resistance state to the high-resistance state, a gate voltage may be applied to the gate of transistor 123*a* via select line 115*a* to open the transistor gate. Meanwhile, a reset signal may be applied to RRAM device 121*a* via column wire 113*a* (or row wire 111*a*), while row wire 111*a* (or column wire 113*a*) may be grounded. The set voltage and the reset voltage may have the same or different polarities.

In another implementation, a transistor in crossbar circuit 100 functions as a switch for selecting one or more RRAM devices but does not control the programming voltages or currents for programming the RRAM devices. As described in greater detail in conjunction with FIGS. 2A and 2B, one or more current-mode digital-to-analog converters (IDACs) (not shown in FIG. 1) may be utilized to program the cross-point devices.

Sensing circuits 140*a*, 140*j*, . . . , 140*m* may include any suitable circuitry for converting the current flowing through a respective column wire 113*a*, 113*j*, . . . , 113*m* into an output signal. For example, each sensing circuit 140*a-m* may include a trans-impedance amplifier (TIA) (not shown) that may convert the current flowing through a respective column wire into a respective voltage signal. Each sensing circuit 140*a-m* may further include an analog-to-digital converter (ADC) (not shown) that may convert the voltage signal produced by its corresponding TIA into a digital output. In some embodiments, the outputs of the sensing circuits 140*a-m* may be provided to controller 150.

Crossbar circuit 100 may perform parallel weighted voltage multiplication and current summation. For example, an input voltage signal may be applied to one or more rows of crossbar circuit 100 (e.g., one or more selected rows). The input signal may flow through the cross-point devices of the rows of the crossbar circuit 100. The conductance of the cross-point device may be tuned to a specific value (also referred to as a "weight"). By Ohm's law, the input voltage multiplies the cross-point conductance and generates a current from the cross-point device. By Kirchhoff's law, the sum of the currents passes through the activated cross-point devices on a respective column (also referred to as the "bit line current"), which may be read from the column. According to Ohm's law and Kirchhoff's current law, the input-output relationship of the crossbar array can be represented as I=VG, wherein I represents the output signal matrix as current; V represents the input signal matrix as voltage; and G represents the conductance matrix of the cross-point devices. As such, the input signal is weighted at each of the cross-point devices by its conductance according to Ohm's law. The weighted current (the "bit line current") is output via each column wire and may be accumulated according to Kirchhoff's current law. This may enable in-memory computing (IMC) via parallel multiplications and summations performed in the crossbar arrays.

Crossbar circuit 100 may be configured to perform vector-matrix multiplication (VMM). A VMM operation may be represented as Y=XA, wherein each of Y, X, A represents a respective matrix. More particularly, for example, input vector X may be mapped to the input voltage V of crossbar circuit 100. Matrix A may be mapped to conductance values G. The output current I may be read and mapped back to output results Y. In some embodiments, crossbar circuit 100 may be configured to implement a portion of a neural network by performing VMMs.

Controller 150 may include any suitable hardware and/or software components for implementing the multi-step programming schemes described herein. In some embodiments, controller 150 may include a processing device as described in connection with FIG. 5 below. Controller 150 may be and/or include a computer system 500 of FIG. 5. In one implementation, controller 150 may be implemented as a stand-alone device that is not part of crossbar circuit 100. In another implementation, controller 150 may be regarded as part of crossbar circuit 100.

Controller 150 may program one or more selected cross-point devices to suitable conductance values by applying a suitable voltage across the selected cross-point devices. For example, controller 150 may provide instructions for generating and applying one or more programming voltages to one or more row line drivers, column wire drivers, and/or select line drivers. The selected cross-point device may be regarded as being programmed to the target conductance value when a difference between the conductance of the selected cross-point device and the target conductance value is not greater than a predetermined threshold.

In some implementations, to perform a forming operation or a set operation on a cross-point device (e.g., cross-point device 120a), controller 150 may cause one or more row wire drivers and column wire drivers to reset the word line voltage applied to the word line connected to the cross-point device and the bit line voltage applied to the bit line connected to the cross-point device. In one implementation, the word line and the bit line connected to cross-point device 120a may be row wire 111a and column 113a, respectively. In another implementation, the bit line and the word line connected to cross-point device 120a may be row wire 111a and column wire 113a, respectively.

Figure 2A:
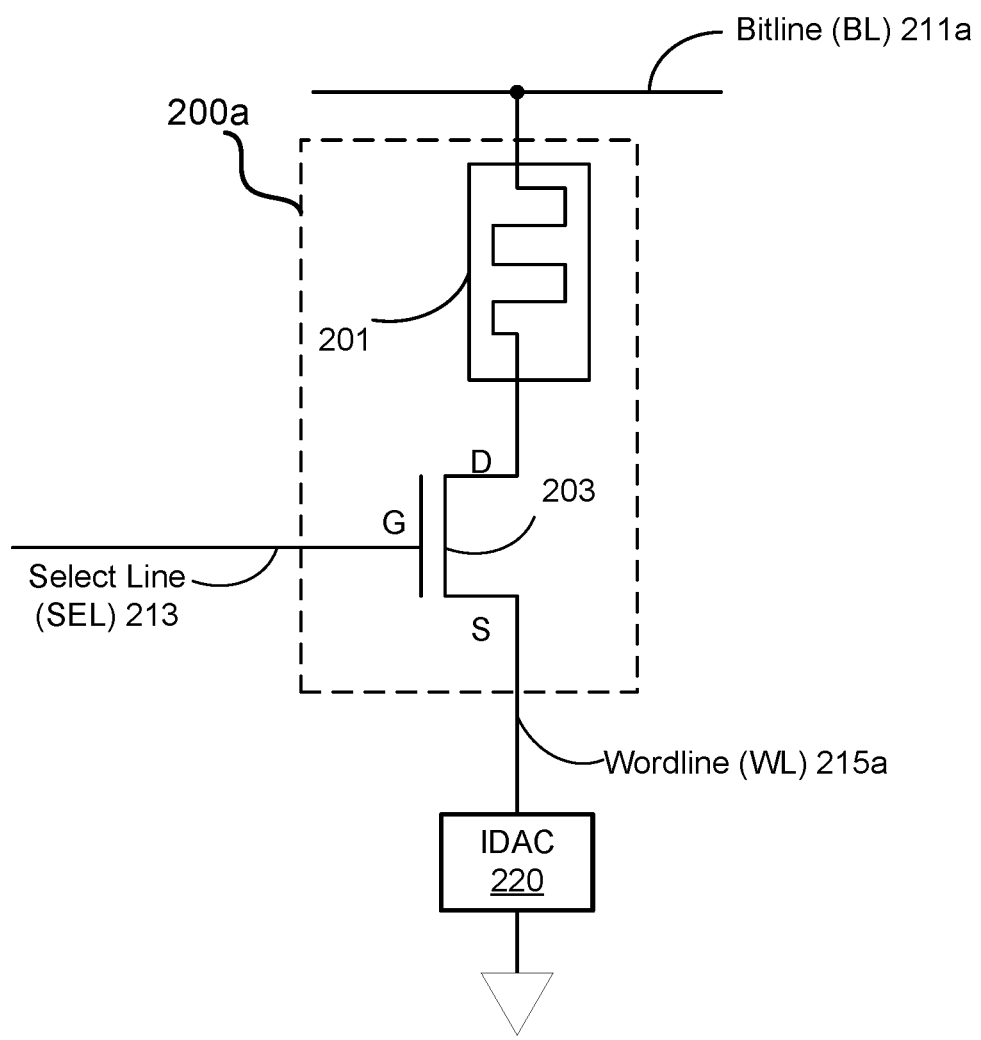
FIGS. 2A and 2B are schematic diagrams illustrating example cross-point devices in accordance with some embodiments of the present disclosure.
Figure 2B:
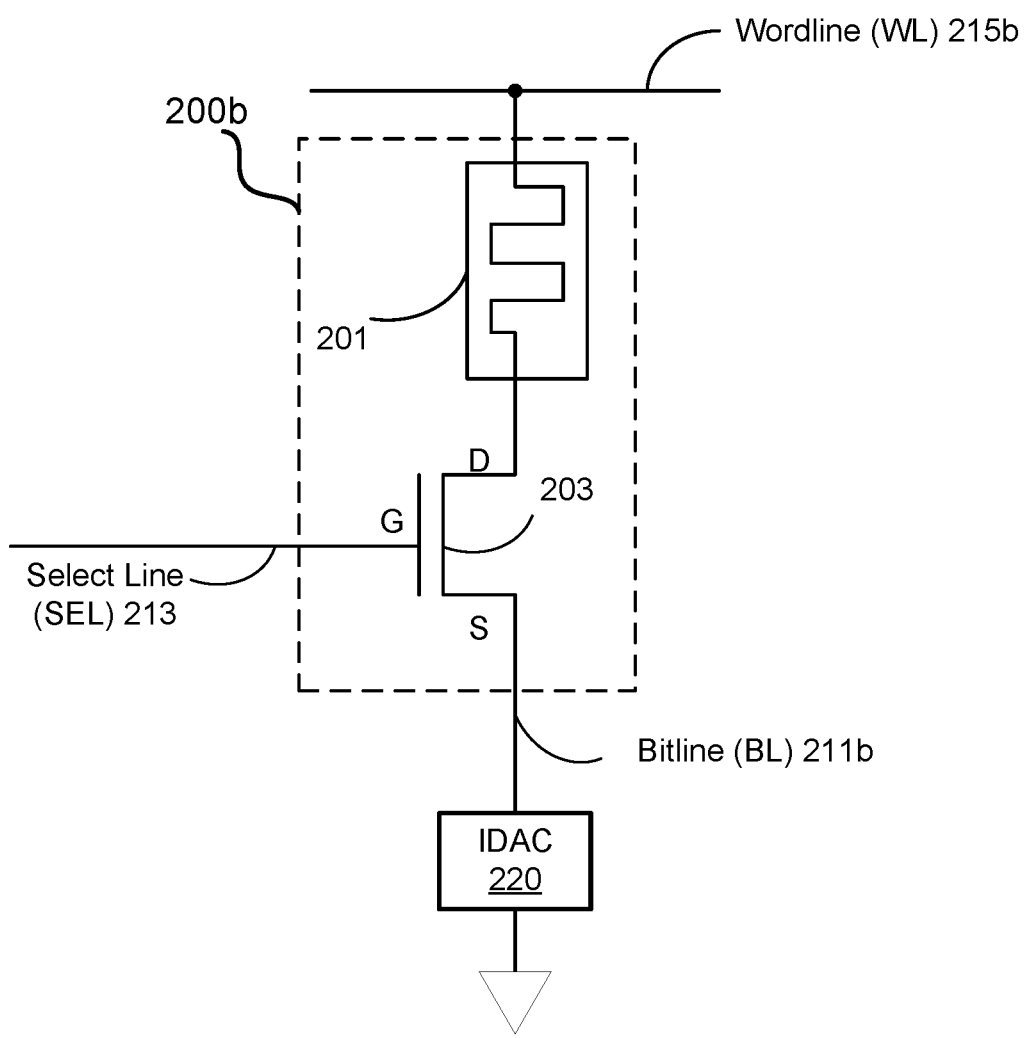

Controller 150 may also initialize the select voltage applied to the select line connected to the cross-point device to a predetermined value (e.g., a value that is equal to or greater than zero). In some embodiments in which an IDAC is used to program the cross-point device (as described in connection with FIGS. 2A-2B), the select voltage may automatically change according to the bit line voltage. Controller 150 may then cause the row wire driver (or the column wire driver) to raise the word line voltage V_wl applied to the cross-point device up to Vmax without changing the bit line voltage being applied to the cross-point device. For example, controller 150 may generate a first control signal for applying a first incremental voltage to the word line and may provide the control signal to the row wire driver. The first incremental voltage is not greater than Vmax. The row wire driver may apply the first incremental voltage to the cross-point device based on the first control signal. Controller 150 may cause the column wire driver or the row line driver to raise the bit line voltage without changing the word line voltage applied to the cross-point device. For example, controller 150 may generate a second control signal for applying a second incremental voltage to the bit line and may provide the control signal to the column wire driver. The column wire driver may apply the second incremental voltage to the bit line based on the control signal. In some embodiments in which an IDAC of FIGS. 2A-2B provides programming signals to the RRAM device, the second incremental voltage is not greater than a difference between the word line voltage being applied to the cross-point device and a threshold voltage of the transistor (i.e., V_wl–Vth). In some embodiments, the second incremental voltage is not higher than the sum of the word line voltage being applied to the cross-point device and the maximum allowed voltage of the transistor (i.e., V_wl+Vmax).

Controller 150 may cyclically repeat the sequence of raising the word line voltage and the bit line voltage until both the word line voltage and the bit line voltage have reached their respective desired levels. In some embodiments, controller 150 may program a cross-point device 120a-z by implementing process 300 of FIG. 3.

In some implementations, to perform a deforming operation or a reset operation on a cross-point device (e.g., cross-point device 120a), controller 150 may cause the row wire drivers and the select line driver to reset the word line voltage applied to the word line connected to the cross-point device and reset the select voltage applied to the select line connected to the cross-point device. Controller 150 may then cause the row wire driver (or the column wire driver) to raise the word line voltage V_wl applied to the cross-point device up to Vmax without changing the select voltage being applied to the cross-point device. For example, controller 150 may generate a third control signal for applying an incremental voltage lower than Vmax to the word line and may provide the control signal to the row wire driver. The row wire driver or the column wire driver may apply the incremental voltage to the cross-point device based on the third control signal. Controller 150 may cause the select wire driver to raise the select voltage up to V_wl–Vth without changing the word line voltage being applied to the cross-point device. For example, controller 150 may generate a fourth control signal for applying an incremental voltage that is not greater than V_wl–Vth to the select line and may provide the control signal to the column wire driver. The select line driver may apply the incremental voltage to the select line based on the fourth signal. Controller 150 may cyclically repeat the sequence of raising the word line voltage and the select voltage until both the word line voltage and the select voltage have reached their respective desired levels. In some embodiments, controller 150 may program a cross-point device 120a-z by implementing process 400 of FIG. 4.

FIGS. 2A and 2B are schematic diagrams illustrating example cross-point devices 200a and 200b in accordance with some embodiments of the present disclosure. Each of cross-point devices 200a and 200b may be referred to as a 1-transistor-1-resistor (1T1R) configuration. As shown, each cross-point device 200a and 200b may be connected to a bit line (BL) 211a or 211b, a select line (SEL) 213, and a word line (WL) 215a or 215b. The bit line 211a-b and the word line 215a-b may be a bit line and a word line as described in connection with FIG. 1, respectively.

As shown in FIGS. 2A and 2B, a cross-point device 200a-b may include an RRAM device 201 serially connected to a transistor 203. A transistor may include three terminals that may be marked as gate (G), source (S), and drain (D), respectively. Referring to FIG. 2A, a first terminal of the RRAM device 201 may be connected to the drain terminal of transistor 203. A second terminal of RRAM device 201 may be connected to a bit line 211a. The source terminal of transistor 203 may be connected to a word line 215a. The gate terminal of transistor 203 may be connected to a select line 213.

IDAC 220 may convert a digital input into an analog output current and may provide linearly controlled output currents based on the digital input. IDAC 220 may produce an output current of a suitable current value for programming the RRAM device to a desirable conductance value. While being connected to word line 215a, IDAC 220 may set the compliance current to cross-point device 200a during the programming of cross-point device 200a and may thus control the conductance and analog behavior of cross-point device 200a. For example, programming the conductance of RRAM device 201 to a predetermined conductance value may involve connecting IDAC 220 to cross-point device 200a and providing a suitable digital input to IDAC 220. IDAC 220 may convert the digital input into an output current that corresponds to a programming current for programming the conductance of RRAM device 201 to the predetermined conductance value. The output current may be applied to RRAM device 201 via word line 215a. While RRAM device 201 and/or cross-point device 200a is programmed, bit line 211a may be connected to a supply voltage. A select voltage may be applied to select line 213 and the gate terminal of transistor 203. The select voltage may be ramped up from a low voltage (e.g., zero) to the supply voltage in a suitable period of time. Due to the high output impedance at the IDAC output node, a SET process may stop automatically when the voltage across the RRAM device is sufficiently high (e.g., greater than a switching voltage threshold). The voltage across RRAM device 201 may be automatically reduced when the conductance of RRAM device 201 approaches the predetermined conductance value. The programming process may then automatically stop after the conductance of RRAM device 201 reaches the predetermined conductance value. As the select voltage applied to the gate terminal of transistor 203 does not function as a programming voltage during the programming of RRAM device 201, transistor 203 functions as a switch for selecting and/or enabling RRAM device 201 and does not set the compliance current of RRAM device 201.

Referring to FIG. 2B, the second terminal of RRAM device 201 of cross-point device 200b may be connected to word line 215b in some embodiments. The source terminal of the transistor 203 of cross-point device 200b may be connected to bit line 211b. While being connected to bit line 211b, IDAC 220 may set the compliance current to cross-point device 200b during the programming of cross-point device 200b and may thus control the conductance and analog behavior of cross-point device 200b. For example, during a set operation or a form operation, word line 215b may be connected to the supply voltage VCC. IDAC 220 may convert a digital input into an output current that corresponds to a programming current for programming the conductance of RRAM device 201 to the predetermined conductance value. The output current may be applied to RRAM device 201 via bit line 211b.

Figure 3:
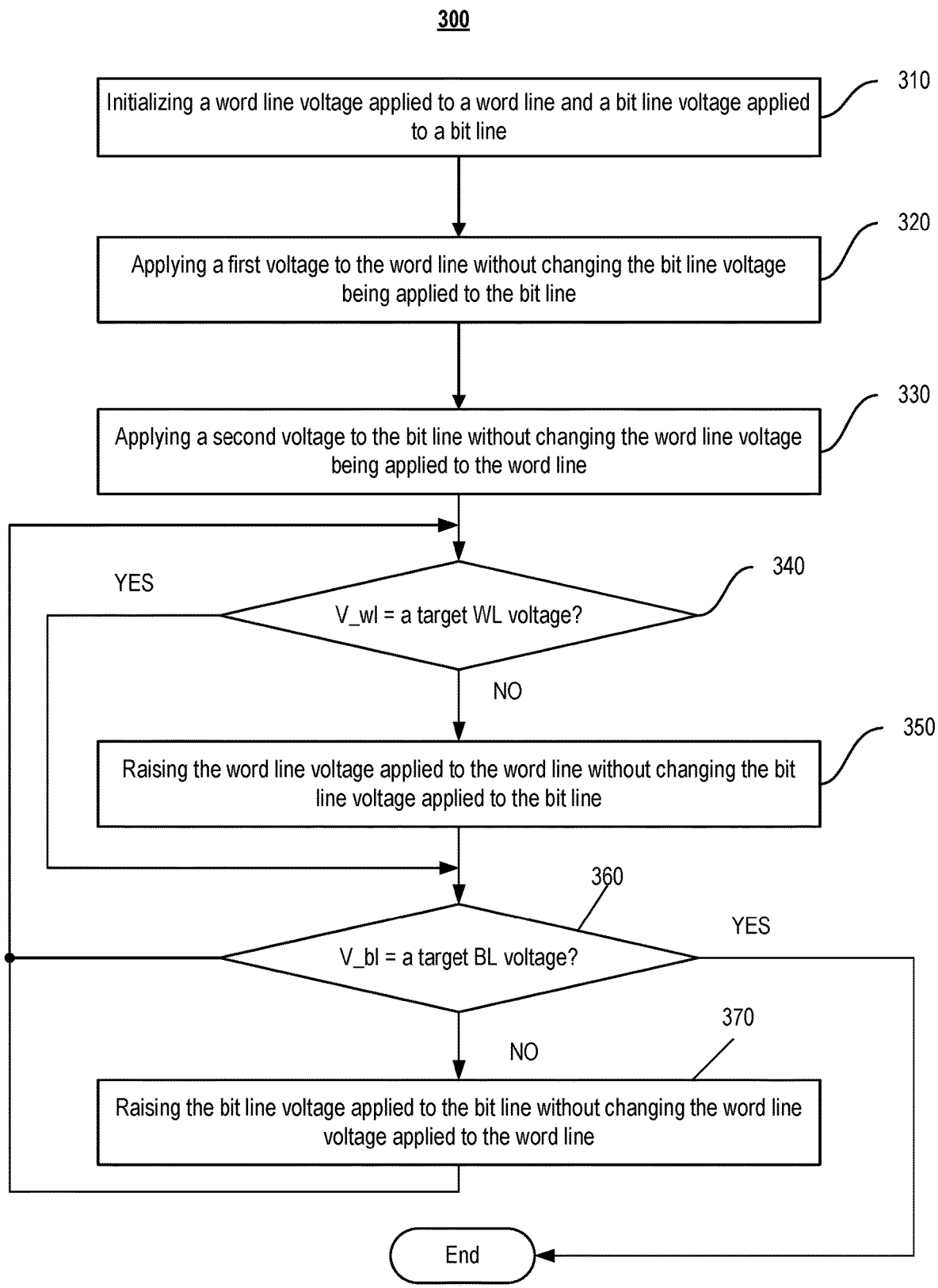
FIGS. 3 and 4 are flowcharts illustrating example processes for programming a crossbar circuit in accordance with some embodiments of the present disclosure.

FIG. 3 is a flowchart illustrating an example 300 of a process for programming a crossbar circuit in accordance with some embodiments of the present disclosure. Process 300 may be executed to perform a forming operation and/or a setting operation on a cross-point device of the crossbar circuit. The cross-point device may be connected to a word line, a bit line, and a select line of the crossbar circuit and may include an RRAM device. The cross-point device may be a cross-point device 120a, . . . , 120z as described in connection with FIG. 1.

Process 300 may start at 310, where the word line voltage applied to the word line and a bit line voltage applied to a bit line may be initialized. For example, the word line voltage and the bit line voltage may be reset to zero. In some embodiments, the select voltage applied to the select line may also be initialized at 310. For example, the select voltage may be set to a predetermined level (e.g., a value equal to or greater than zero).

At 320, a first voltage may be applied to the word line without changing the bit line voltage being applied to the bit line. The first voltage is not greater than the maximum allowed voltage for the transistor that provides access control for the RRAM device in the cross-point device. As such, the word line voltage is raised while the bit line voltage is still reset to zero.

At 330, a second voltage may be applied to the bit line without changing the word line voltage being applied to the word line. As such, the word line voltage applied to the word line is the first voltage while the bit line voltage is raised to the second voltage. In some implementations in which an IDAC as described in connection with FIGS. 2A-2B provides programming signals to the RRAM device, the second voltage is not greater than a difference between the word line voltage being applied to the cross-point device (i.e., the first voltage) and a threshold voltage of the transistor. In another implementation, the second voltage is not higher than the sum of the word line voltage being applied to the cross-point device and the maximum allowed voltage of the transistor.

At 340, a determination may be made as to whether a target word line voltage is applied to the first cross-point device. The target word line voltage may be higher than the maximum allowed voltage of the transistor. In view of a determination that the word line voltage being applied to the word line is not the target word line voltage (e.g., the word line voltage being lower than the target word line voltage), process 300 may proceed to block 350.

At 350, the word line voltage may be raised without changing the bit line voltage being applied to the bit line. For example, a first incremental voltage may be applied to the word line. The first incremental voltage is not greater than the maximum allowed voltage of the transistor that provides access control for the RRAM device in the cross-point device.

At 360, a determination may be made as to whether a target bit line voltage is applied to the bit line. The target bit line voltage may be higher than the maximum allowed voltage of the transistor that provides access control for the RRAM device in the cross-point device. In view of a determination that the bit line voltage being applied to the bit line is not the target bit line voltage (e.g., the bit line voltage being applied to the bit line is lower than the target bit line voltage), process 300 may proceed to block 370.

At 370, the bit line voltage may be raised without changing the word line voltage applied to the word line. For example, a second incremental voltage may be applied to the bit line. In some implementations in which an IDAC as described in connection with FIGS. 2A-2B provides programming signals to the RRAM device, the second incremental voltage is not greater than a difference between the word line voltage being applied to the cross-point device and the threshold voltage of the transistor. In another implementation, the second incremental voltage is not higher than the sum of the word line voltage being applied to the cross-point device and the maximum allowed voltage of the transistor.

After performing the operations depicted in block 370, process 300 may loop back to block 340. If the word line voltage being applied to the word line is not the target word line voltage (e.g., "NO" at 340), another incremental voltage may be applied to the word line while the bit line voltage being applied to the bit line is not changed. Similarly, if the bit line voltage applied to the bit line is not the target bit line voltage (e.g., "NO" at 360), another incremental voltage may be applied to the bit line. Each incremental voltage applied to the bit line or the word line is not greater than the maximum allowed voltage of the transistor that provides access control to the RRAM device. Process 300 may conclude when the target word line voltage and the target bit line voltage are applied to the word line and the bit line, respectively (e.g., "YES" at block 340 and 360).

Figure 4:
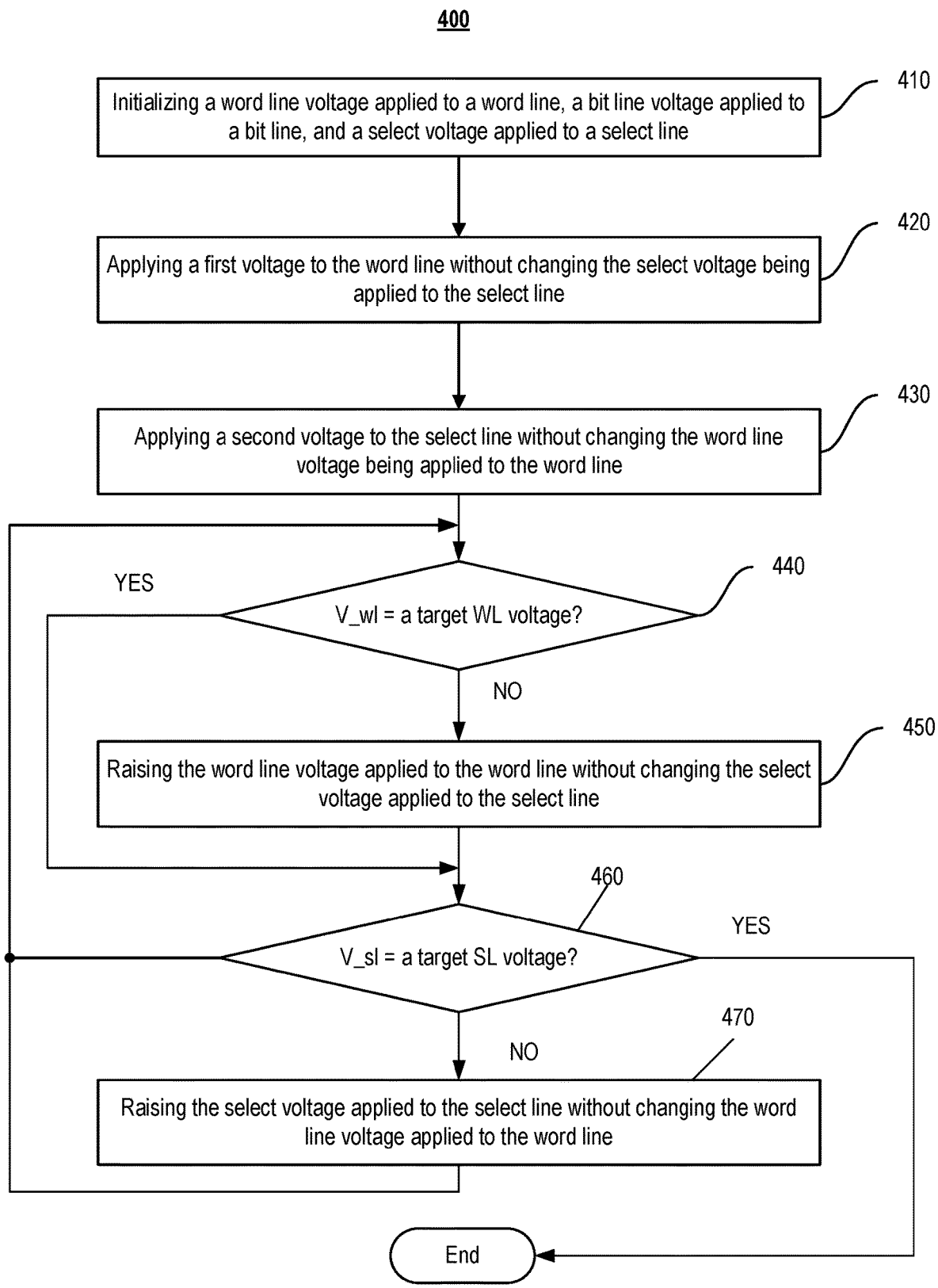

FIG. 4 is a flow chart illustrating an example 400 of a process for programming a crossbar circuit in accordance with some embodiments of the present disclosure. Process 400 may be executed to perform a deforming operation and/or a resetting operation on a cross-point device of the crossbar circuit. The cross-point device may be connected to a word line, a bit line, and a select line of the crossbar circuit and may include an RRAM device. The cross-point device may be a cross-point device 120a, . . . , 120z as described in connection with FIG. 1.

Process 400 may start at 410, where the word line voltage applied to the word line and a select voltage applied to the select line may be initialized. For example, the word line voltage and the select voltage may be reset to zero. In some embodiments, the bit line voltage applied to the bit line connected to the cross-point device may also be initialized at 410. For example, the bit line may be connected to a predetermined voltage source (e.g., VSS) and/or set to a predetermined value.

At 420, a first voltage may be applied to the word line without changing the select voltage being applied to the select line. The first voltage is not greater than the maximum allowed voltage for the transistor that provides access control for the RRAM device in the cross-point device. As such, the word line voltage is raised while the select voltage is still reset to zero.

At 430, a second voltage may be applied to the select line without changing the word line voltage being applied to the word line. As such, the word line voltage applied to the word line is the first voltage while the select voltage is raised to the second voltage. The second voltage is not greater than a difference between the word line voltage being applied to the cross-point device (i.e., the first voltage) and a threshold voltage of the transistor.

At 440, a determination may be made as to whether a target word line voltage is applied to the first cross-point device. The target word line voltage may be higher than the maximum allowed voltage of the transistor. In view of a determination that the word line voltage being applied to the word line is not the target word line voltage (e.g., the word line voltage being lower than the target word line voltage), process 400 may proceed to block 450.

At 450, the word line voltage may be raised without changing the select voltage being applied to the select line. For example, a first incremental voltage may be applied to the word line. The first incremental voltage is not greater than the maximum allowed voltage of the transistor that provides access control for the RRAM device in the cross-point device.

At 460, a determination may be made as to whether a target select voltage is applied to the select line. The target select voltage may be higher than the maximum allowed voltage of the transistor that provides access control for the RRAM device in the cross-point device. In view of a determination that the select voltage being applied to the select line is not the target select voltage (e.g., the select voltage being applied to the select line is lower than the target select voltage), process 400 may proceed to block 470.

At 470, the select voltage may be raised without changing the word line voltage applied to the word line. For example, a second incremental voltage may be applied to the select line. The second voltage is not greater than a difference between the word line voltage being applied to the cross-point device and the threshold voltage of the transistor.

After performing the operations depicted in block 470, process 400 may loop back to block 440. If the word line voltage being applied to the word line is not the target word line voltage (e.g., "NO" at 440), another incremental voltage may be applied to the word line while the select voltage being applied to the select line is not changed. Similarly, if the select voltage applied to the select line is not the target select voltage (e.g., "NO" at 460), another incremental voltage may be applied to the select line. Process 400 may conclude when the target word line voltage and the target select voltage are applied to the word line and the select line, respectively (e.g., "YES" at blocks 440 and 460).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 5:
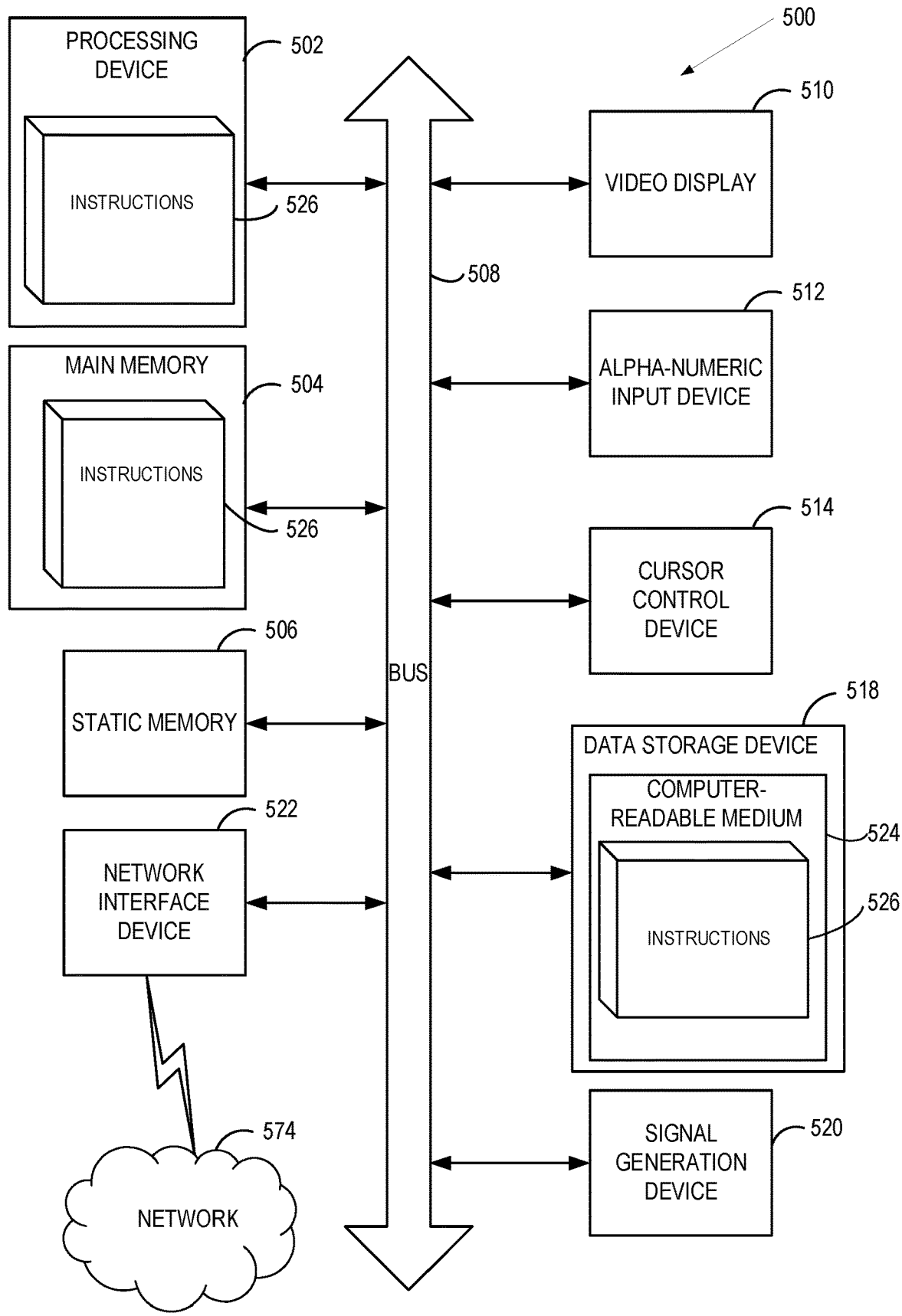
FIG. 5 illustrates a diagrammatic representation of a machine in the exemplary form of a computer system in accordance with some embodiments of the present disclosure.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device (processor) 602, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage device 518, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application-specific integrated circuit (ASIC), a field programmable gate array (FPGA), a digital signal processor (DSP), a network processor, or the like. The processing device 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting computer-readable storage media. Instructions 526 may further be transmitted or received over a network 574 via the network interface device 522.

In one embodiment, instructions 526 include instructions and/or a software library for implementing process 300 of FIG. 3 and/or process 400 of FIG. 4. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The terms "approximately," "about," and "substantially" as used herein may mean within a range of normal tolerance in the art, such as within 2 standard deviations of the mean, within ±20% of a target dimension in some embodiments, within ±10% of a target dimension in some embodiments, within ±5% of a target dimension in some embodiments, within ±2% of a target dimension in some embodiments, within ±1% of a target dimension in some embodiments, and yet within ±0.1% of a target dimension in some embodiments. The terms "approximately" and "about" may include the target dimension. Unless specifically stated or obvious from context, all numerical values described herein are modified by the term "about."

As used herein, a range includes all the values within the range. For example, a range of 1 to 10 may include any number, combination of numbers, sub-range from the numbers of 1, 2, 3, 4, 5, 6, 7, 8, 9, and 10 and fractions thereof.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

The terms "first," "second," "third," "fourth," etc. as used herein are meant as labels to distinguish among different elements and may not necessarily have an ordinal meaning according to their numerical designation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

As used herein, when an element or layer is referred to as being "on" another element or layer, the element or layer may be directly on the other element or layer, or intervening elements or layers may be present. In contrast, when an element or layer is referred to as being "directly on" another element or layer, there are no intervening elements or layers present.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method for programming a crossbar circuit, the method comprising:
    initializing a word line voltage applied to a word line and a bit line voltage applied to a bit line, wherein a cross-point device of the crossbar circuit is connected to the word line and the bit line, and wherein the cross-point device comprises a resistive random-access memory (RRAM) device;
    applying a first voltage to the word line without changing the bit line voltage applied to the bit line;
    applying a second voltage to the bit line without changing the word line voltage applied to the word line; and
    in view of a determination that a target word line voltage is not applied to the cross-point device, applying a first incremental voltage to the word line.

2. The method of claim 1, wherein each of the first voltage, the second voltage, and the first incremental voltage is not greater than a maximum allowed voltage of a transistor that provides access control for the RRAM device.

3. The method of claim 2, wherein the target word line voltage is greater than the maximum allowed voltage of the transistor that provides access control for the RRAM device.

4. The method of claim 2, further comprising in view of a determination that a target bit line voltage is not applied to the bit line, applying a second incremental voltage to the bit line without changing the word line voltage applied to the word line.

5. The method of claim 4, wherein the second incremental voltage is not greater than a difference between the word line voltage being applied to the cross-point device and a threshold voltage of the transistor.

6. The method of claim 4, wherein the second incremental voltage is not greater than a sum of the word line voltage being applied to the cross-point device and the maximum allowed voltage of the transistor.

7. The method of claim 4, wherein the target bit line voltage is greater than the maximum allowed voltage of a transistor that provides access control for the RRAM device.

8. The method of claim 1, wherein initializing the word line voltage applied to the word line comprises setting the word line voltage applied to the word line to zero.

9. The method of claim 1, wherein initializing the bit line voltage applied to the bit line comprises setting the bit line voltage applied to the bit line to zero.

10. The method of claim 1, further comprising applying a predetermined select voltage to a select line connected to the cross-point device.

11. The method of claim 1, wherein the crossbar circuit comprises a plurality of word lines intersecting with a plurality of bit lines and a plurality of cross-point devices, wherein each of the plurality of cross-point devices is connected to one of the plurality of word lines and one of the plurality of bit lines.

12. A method for programming a crossbar circuit, the method comprising:
   initializing a word line voltage applied to a word line and a select voltage applied to a select line, wherein a cross-point device of the crossbar circuit is connected to the word line and the select line, and wherein the cross-point device comprises a resistive random-access memory (RRAM) device;
   applying a first voltage to the word line without changing the select voltage applied to the select line;
   applying a second voltage to the select line without changing the word line voltage applied to the word line; and
   in view of a determination that a target word line voltage is not applied to the cross-point device, applying a first incremental voltage to the word line.

13. The method of claim 12, further comprising:
   connecting a bit line voltage applied to a bit line connected to the cross-point device to a predetermined voltage source.

14. The method of claim 12, wherein each of the first voltage, the second voltage, and the first incremental voltage is not greater than a maximum allowed voltage of a transistor that provides access control for the RRAM device.

15. The method of claim 14, wherein the target word line voltage is greater than the maximum allowed voltage of the transistor that provides access control for the RRAM device.

16. The method of claim 15, further comprising in view of a determination that a target select voltage is not applied to the select line, applying a second incremental voltage to the select line without changing the word line voltage being applied to the word line, wherein the second incremental voltage is not greater than a difference between the word line voltage being applied to the cross-point device and a threshold voltage of the transistor.

17. The method of claim 16, wherein the target select voltage is greater than the maximum allowed voltage of a transistor that provides access control for the RRAM device.

18. The method of claim 12, wherein initializing the word line voltage applied to the word line comprises setting the word line voltage applied to the word line to zero.

19. The method of claim 12, wherein initializing the select voltage applied to the select line comprises setting the select voltage applied to the select line to zero.

20. The method of claim 12, wherein the crossbar circuit comprises a plurality of word lines intersecting with a plurality of bit lines and a plurality of cross-point devices, wherein each of the cross-point devices is connected to one of the word lines and one of the bit lines, wherein each of the cross-point devices comprises a resistive random-access memory (RRAM) device.

* * * * *